(12) United States Patent
Kraft et al.

(10) Patent No.: US 6,938,034 B1
(45) Date of Patent: Aug. 30, 2005

(54) SYSTEM AND METHOD FOR COMPARING AND REPRESENTING SIMILARITY BETWEEN DOCUMENTS USING A DRAG AND DROP GUI WITHIN A DYNAMICALLY GENERATED LIST OF DOCUMENT IDENTIFIERS

(75) Inventors: Reiner Kraft, Gilroy, CA (US); Joann Ruvolo, San Jose, CA (US)

(73) Assignee: International Business Machines Corporation, Armonk, NY (US)

(*) Notice: Subject to any disclaimer, the term of this patent is extended or adjusted under 35 U.S.C. 154(b) by 600 days.

(21) Appl. No.: 09/651,073

(22) Filed: Aug. 30, 2000

(51) Int. Cl.[7] .............................................. G06F 17/30
(52) U.S. Cl. ........................... 707/3; 707/104.1; 707/7
(58) Field of Search ................................ 707/2, 3, 4, 5, 707/7, 10, 513, 526, 104.1, 6; 706/45

(56) References Cited

U.S. PATENT DOCUMENTS

| | | | |
|---|---|---|---|
| 6,038,561 A * | 3/2000 | Snyder et al. ................. 707/6 |
| 6,163,782 A * | 12/2000 | Singhal .................... 707/104.1 |
| 6,236,987 B1 * | 5/2001 | Horowitz et al. ............. 707/3 |
| 6,427,146 B1 * | 7/2002 | Chu ............................. 707/3 |
| 6,453,312 B1 * | 9/2002 | Goiffon et al. ................ 707/3 |
| 6,502,112 B1 * | 12/2002 | Baisley ....................... 715/513 |
| 6,529,903 B2 * | 3/2003 | Smith et al. ................... 707/7 |

OTHER PUBLICATIONS http://www.hotbot.com.

* cited by examiner

Primary Examiner—Charles Rones
(74) Attorney, Agent, or Firm—Jon A. Gibbons; Fleit, Kain, Gibbons, Gutman, Bongini & Bianco P.L.

(57) ABSTRACT

The present invention relates to the field of data processing, and particularly to a software system and associated method for use with a search engine. The engine searches data maintained in systems that are linked together over an associated network such as the Internet. More specifically, this invention pertains to a computer software product for determining, comparing, and representing the similarity between documents using a drag and drop Graphical User Interface (GUI) within a dynamically generated list of document identifiers. The invention uses this drag and drop GUI interface for convenient selection of document identifiers for further comparison. Then processing of a similarity analysis request using a configurable similarity algorithm is executed; this processing can be done on the client, proxy or server side. When the comparison process is completed, the GUI presents the similarity result of the comparison process as a Venn Diagram to show the level of similarity between the selected documents.

22 Claims, 10 Drawing Sheets

20% Similarity

SYSTEM AND METHOD FOR COMPARING AND REPRESENTING SIMILARITY BETWEEN DOCUMENTS USING A DRAG AND DROP GUI WITHIN A DYNAMICALLY GENERATED LIST OF DOCUMENT IDENTIFIERS

PARTIAL WAIVER OF COPYRIGHT

All of the material in this patent application is subject to copyright protection under the copyright laws of the United States and of other countries. As of the first effective filing date of the present application, this material is protected as unpublished material. However, permission to copy this material is hereby granted to the extent that the copyright owner has no objection to the facsimile reproduction by anyone of the patent documentation or patent disclosure, as it appears in the United States Patent and Trademark Office patent file or records, but otherwise reserves all copyright rights whatsoever.

CROSS-REFERENCE TO RELATED APPLICATIONS

Not Applicable

BACKGROUND OF THE INVENTION

1. Field of the Invention

The present invention relates generally to Internet search technology and more specifically the present invention relates to a system and method for determining the suitability of a search result.

2. Description of the Related Art

Figure 1:
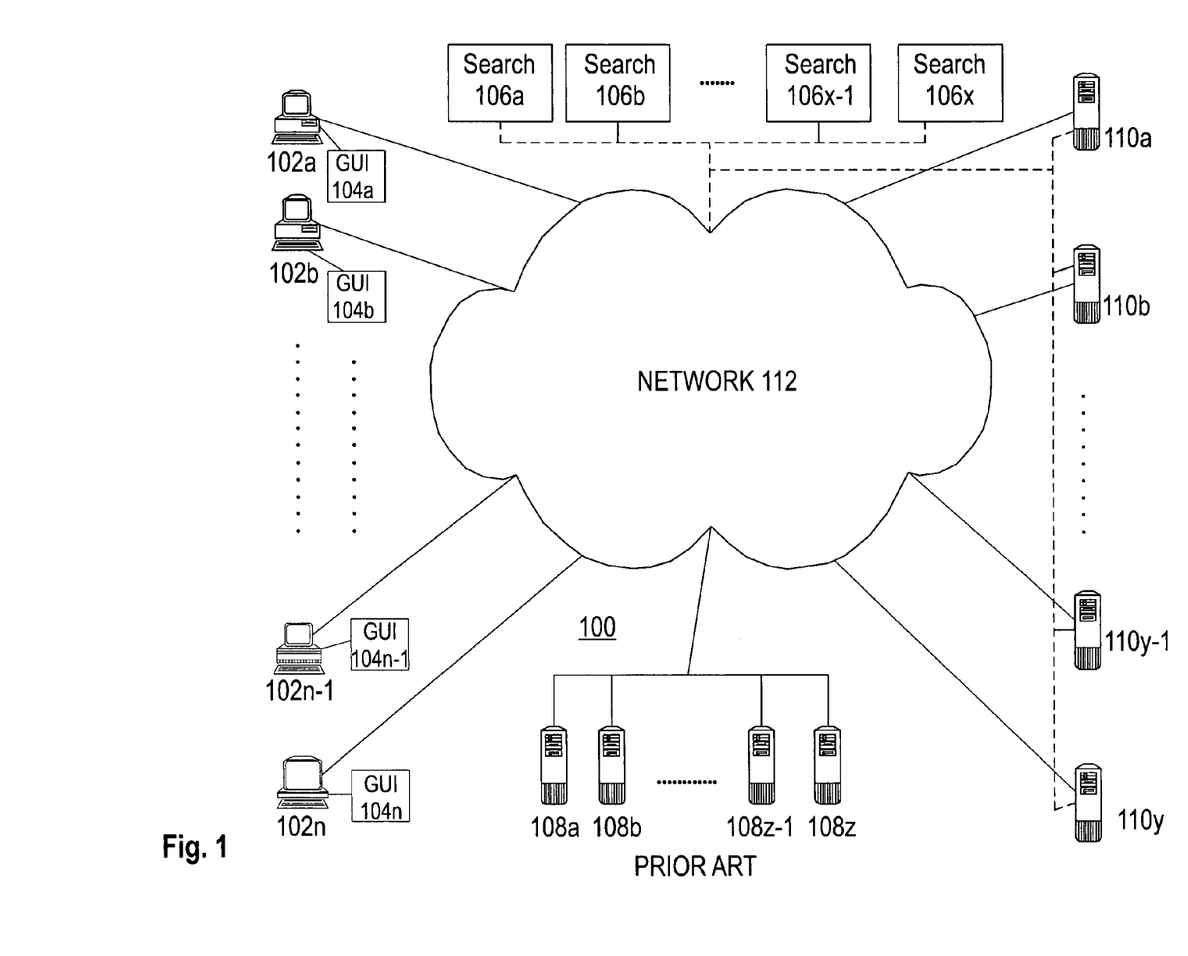
FIG. 1 is a system level overview of a prior art distributed computer network within which the invention may be practiced.

FIG. 1 is a system level overview (100) of a prior art distributed computer network within which the invention may be practiced. The World Wide Web (WWW) is comprised of an expansive network (112) of interconnected computers (102a to 102n) upon which businesses, governments, groups, and individuals throughout the world maintain interlinked computer files known as web pages. Users navigate these pages by means of computer software programs commonly known as Internet browsers (GUI 104a to 104n). Due to the vast number of WWW sites, many web pages have a redundancy of information or share a strong likeness in either function or title. The vastness of the unstructured WWW causes users to rely primarily on Internet search engines (106a to 106x) located in association with or independent of server hub processing units (110a to 110y) to retrieve information or to locate businesses. These search engines use various means to determine the relevance of a user-defined search to the information retrieved.

The authors of web pages provide information known as metadata, within the body of the hypertext markup language (HTML) document that defines the web pages. A computer software product known as a web crawler, systematically accesses these web pages by sequentially following hypertext links from page to page. The web crawler indexes the pages for use by the search engines using information about a web page as provided by its address or Universal Resource Locator (URL), metadata, and other criteria found within the page. The crawler is run periodically to update previously stored data and to append information about newly created web pages. This information compiled by the crawler is stored in a metadata repository or database. Then, the search engines search this repository to identify matches for the user-defined search rather than attempt to find matches in real time.

A typical search engine has an interface with a search window where the user enters an alphanumeric search expression or keywords. The search engine sifts through available web sites for the user's search terms and returns the search of results in the form of HTML pages. Each search result includes a list of individual entries that have been identified by the search engine as satisfying the user's search expression. Each entry or "hit" includes a hyperlink that points to a Uniform Resource Locator (URL) location or web page.

In addition to the hyperlink, certain search result pages include a short summary or abstract that describes the content of the URL location. Typically, search engines generate this abstract from the file at the URL and only provide acceptable results for URLs that point to HTML format documents. For URLs that point to HTML documents or web pages, a typical abstract includes a combination of values selected from HTML tags. These values may include a text from the web page's "title" tag, from what are referred to as "annotations" or "meta tag values" such as "description", "keywords", or their equivalent, from "heading" tag values (e.g., H1, H2 tags), or from some combination of the content of these tags.

However, for one HTML parent page with links to multiple different relevant non-HTML documents that satisfy the user's search criteria, the search result may include multiple identical URLs one for each relevant non-HTML document. Each of these identical URLs points to the same HTML parent page and each may include an identical abstract that is descriptive of the parent HTML page. As a result, the search results in redundant abstracts can be practically useless, distracting, and time consuming to review.

To alleviate this problem, the popularity of domain-specific portal sites that act as gateways to very specialized information sources has grown concurrently with the WWW; this growth has occurred in both complexity and volume of data. The term "portal" is generally synonymous with gateway; it is typically used to refer to a WWW site which is intended to be a major starting site or as an anchor site for web users. Current leading general purpose portal sites include: Yahoo!®, Excite®, Netscape®, Lycos®, Cnet®, and MSN The Microsoft Network®. However, while such portal sites attempt to serve as gateways to a wide variety of general purpose information, specialized portals have also been gaining popularity in recent years.

Specialized portal sites, such as the jCentral®, xCentral, or their equivalents attempt to focus on a particular domain that appeals to a target audience. By limiting the scope of their operation, the belief is that specialized portal sites will be able to present information of greater relevance to their target audience. For example, in a portal site such as jCentral® that caters to users interested in learning more about the Java programming language and related topics, users are allowed to conduct a search by querying the portal database. The portal database is a vast repository of pre-collected, indexed, and summarized information, typically gathered from the WWW using automated crawling tools as described previously. When a user enters a query, the portal's search engine attempts to match the keywords specified by the user with summarized metadata that have been previously extracted from the documents stored in the repository, and then returns an ordered list of potential candidate matches relevant to the user's query.

Typically, the search engine will return a result set for a search query including a URL and a text based abstract of the original resource. Also, users are sometimes able to control the length of the abstract. For instance, the HotBot® site at URL: http://www.hotbot.com, provides the choice of having only a list of URLs displayed as the search result, the URL with a brief abstract, or a comprehensive abstract.

Although, the return of search queries in list is useful, it is not intuitive and this is a problem. In particular, there is no means or mechanism that allows a user to perform comparisons between different search result items, and provide an intuitive GUI for displaying this similarity. Such a comparison would assist a user in his or her decision of whether or not a particular document might be of interest. For example, a user knows the content of the document and is generally satisfied with the overall content in relation to the issued search query. Another document B, displayed on the same search result page, has a promising title and abstract. However, there is no additional information available from the search result page. Instead of loading document B into a document viewer, scanning through the content, and determining whether the document itself has similar properties as document A, which is a time consuming process. Accordingly, a need exists for a mechanism to perform this task automatically and conveniently.

A search result set represents just one type of similarity comparison. More generally, the problem arises with a list, which contains document identifiers but which contains no information on whether or not these documents are similar. Accordingly, a need exists for a method and system for comparing the similarity between two or more documents.

Other prior art solutions to comparing the similarity between two or more documents such as those offered by Google which (http://www.google.com) provides a search for similar pages and uses a search result item as search argument input. However, this approach does not have the flexibility to permit user selected arbitrary documents to be compared for similarity. Accordingly, a need exists for a method and system for comparing the similarity between two or more documents.

SUMMARY OF THE INVENTION

The present invention provides the functionality of performing a convenient and facile comparison of similarity between documents based on a dynamic set of document identifiers. The present invention provides additional value for the user and distinguishes a search service using this mechanism from the competition.

The present invention relates to the field of data processing, and particularly to a software system and associated method for use with a search engine. The engine searches data maintained in systems that are linked together over an associated network such as the Internet. More specifically, this invention pertains to a computer software product for determining, comparing, and representing the similarity between documents using a drag and drop Graphical User Interface (GUI) within a dynamically generated list of document identifiers. The invention uses this drag and drop GUI interface for convenient selection of document identifiers for further comparison. Then processing of a similarity analysis request using a configurable similarity algorithm is executed; this processing can be done on the client, proxy or server side. When the comparison process is completed, the GUI presents the similarity result of the comparison process as a Venn Diagram to show the level of similarity between the selected documents.

BRIEF DESCRIPTION OF THE FIGURES

The subject matter which is regarded as the invention is particularly pointed out and distinctly claimed in the claims at the conclusion of the specification. The foregoing and other objects, features, and advantages of the invention will be apparent from the following detailed description taken in conjunction with the accompanying drawings.

DETAILED DESCRIPTION OF THE PREFERRED EMBODIMENTS

It is important to note that these embodiments are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in the plural and vice versa with no loss of generality.

In the drawing like numerals refer to like parts through several views.

Glossary of Terms Used in this Disclosure

The following definitions and explanations provide background information pertaining to the technical field of the present invention, and are intended to facilitate the understanding of the present invention without limiting its scope:

Crawler: A program that automatically explores the World Wide Web by retrieving a document and recursively retrieving some or all the documents that are linked to it.

Dictionary: A database of context-related terms.

HTML (Hypertext Markup Language): A standard language for attaching presentation and linking attributes to informational content within documents. During a document authoring stage, HTML "tags" are embedded within the informational content of the document. When the web document (or "HTML document") is subsequently transmitted by a web server to a web browser, the tags are interpreted by the browser and used to parse and display the document. In addition to specifying how the web browser is to display the document, HTML tags can be used to create hyperlinks to other web documents.

Internet: A collection of interconnected public and private computer networks that are linked together with routers by a set of standards protocols to form a global, distributed network.

Search engine: A remotely accessible World Wide Web tool that allows users to conduct keyword searches for information on the Internet.

Server: A software program or a computer that responds to requests from a web browser by returning ("serving") web documents.

URL (Uniform Resource Locator): A unique address that fully specifies the location of a content object on the Internet. The general format of a URL is protocol://server-address/Path/filename.

Web browser: A software program that allows users to request and read hypertext documents. The browser gives some means of viewing the contents of web documents and of navigating from one document to another. Popular examples are Microsoft's Internet Explorer or Netscape's Navigator.

Web document or page: A collection of data available on the World Wide Web and identified by a URL. In the simplest, most common case, a web page is a file written in HTML and stored on a web server. It is possible for the server to generate pages dynamically in response to a request from the user. A web page can be in any format that the browser or a helper application can display. The format is transmitted as part of the headers of the response as a MIME type, e.g., "text/html", "image/gif". An HTML web page will typically refer to other web pages and Internet resources by including hypertext links.

Web Site: A database or other collection of inter-linked hypertext documents ("web documents" or "web pages") and associated data entities, which is accessible via a computer network, and which forms part of a larger, distributed informational system such as the WWW. In general, a web site corresponds to a particular Internet domain name, and includes the content of a particular organization. Other types of web sites may include, for example, a hypertext database of a corporate "intranet" (i.e., an internal network which uses standard Internet protocols), or a site of a hypertext system that uses document retrieval protocols other than those of the WWW.

World Wide Web (WWW): An Internet client—server hypertext distributed information retrieval system.

Overview of the Current Invention

The present invention provides software system and associated method for use with a search engine. The engine searches data maintained in systems that are linked together over an associated network such as the Internet. More specifically, this invention pertains to a computer software product for determining, comparing, and representing the similarity between documents using a drag and drop Graphical User Interface (GUI) within a dynamically generated list of document identifiers. The invention uses this drag and drop GUI interface for convenient selection of document identifiers for further comparison. Then processing of a similarity analysis request using a configurable similarity algorithm is executed. One such similarity algorithm is disclosed in U.S. patent application Ser. No. 09/543,230 filed on Apr. 5, 2000, with inventors Reiner Kraft, Qi Lu, and Shang-Hua Teng, entitled "Method and Apparatus for Determining the Similarity of Complex Designs" which is hereby incorporated in its entirety by reference. The processing of similarity analysis can be done on the client, proxy or server side. When the comparison process is completed, the GUI presents the similarity result of the comparison process as a Venn Diagram to show the level of similarity between the selected documents.

The following example will illustrate how the invention works using a search result set as a preferred embodiment. Consider for instance that a user knows the content of a document A, and that user is generally satisfied with the overall content in relation to the issued search query. Another document B, displayed on the same search result page, has a promising title and abstract. However, there is no further information available from the search result page. Instead of loading document B into a document viewer, reading through the content and determining whether or not the document itself has similar properties as document A, which is a time-consuming process, the user actuates the present invention to perform this function. In particular, the user issues a selection request utilizing a pointing device like a mouse by clicking and holding the left mouse button to select the document link of document B. Then the user is able to drag and drop the document B identifier to the document A identifier, thereby starting the comparison process of the two selected documents. As a result, a GUI will be presented using a Venn diagram to show the similarity of the two documents.

One embodiment of the invention integrates it within the Grandcentral Station site of portals (jCentral®, xCentral).

System Level Overview

Figure 2:
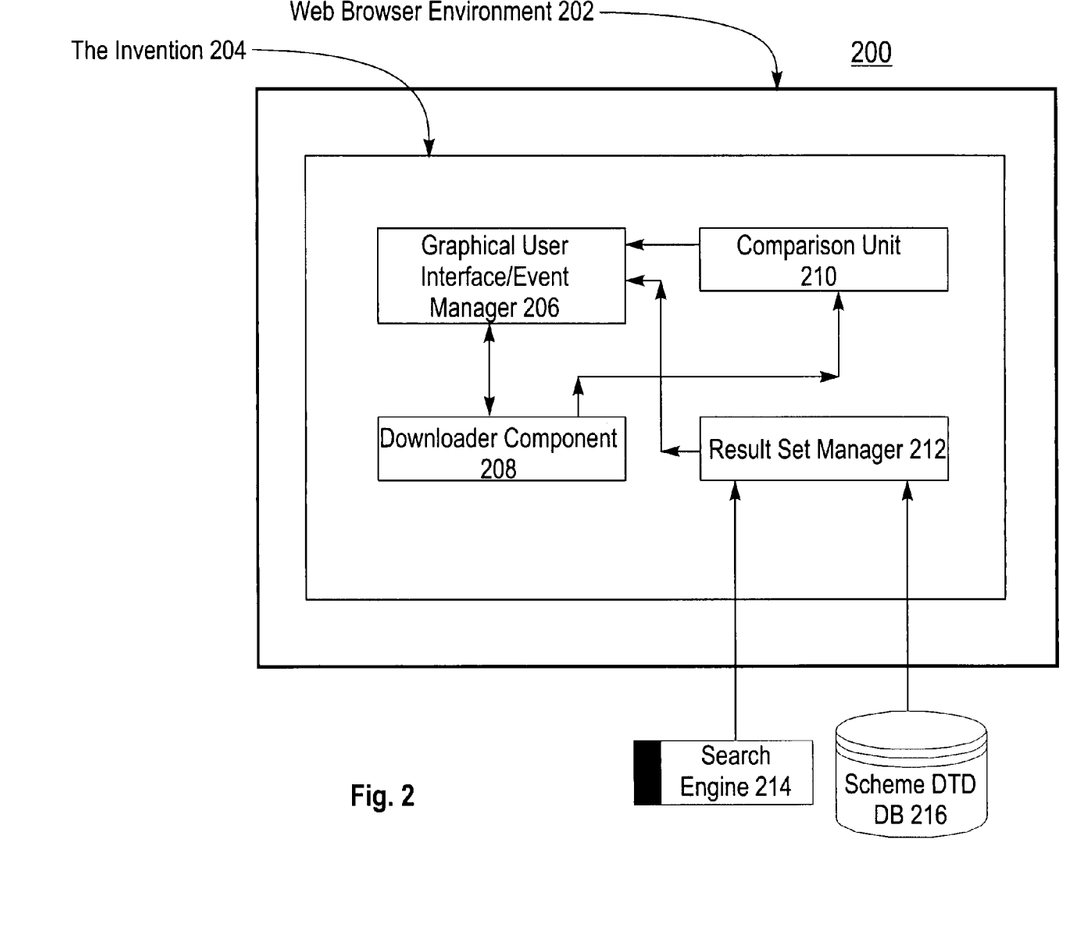
FIG. 2 is a system level overview of the Components for the invention to accomplish the Comparison and Representation of Similarity between selected documents.

FIG. 2 is a system level overview (200) of the Components for the invention to accomplish the Comparison and Representation of Similarity between selected documents.

The invention (204) resides within a web browser environment (202). The System Architecture for the invention is composed of the following components:
1. GUI/Event Manager (206);
2. Downloader Component (208);
3. Result Set Manager (212);
4. Comparison Unit (210);
5. Scheme DTD (data type descriptor) DB (database) (216);
6. A search engine (214).

Graphical User Interface (GUI) and Associated Venn Diagram

Figure 3A:
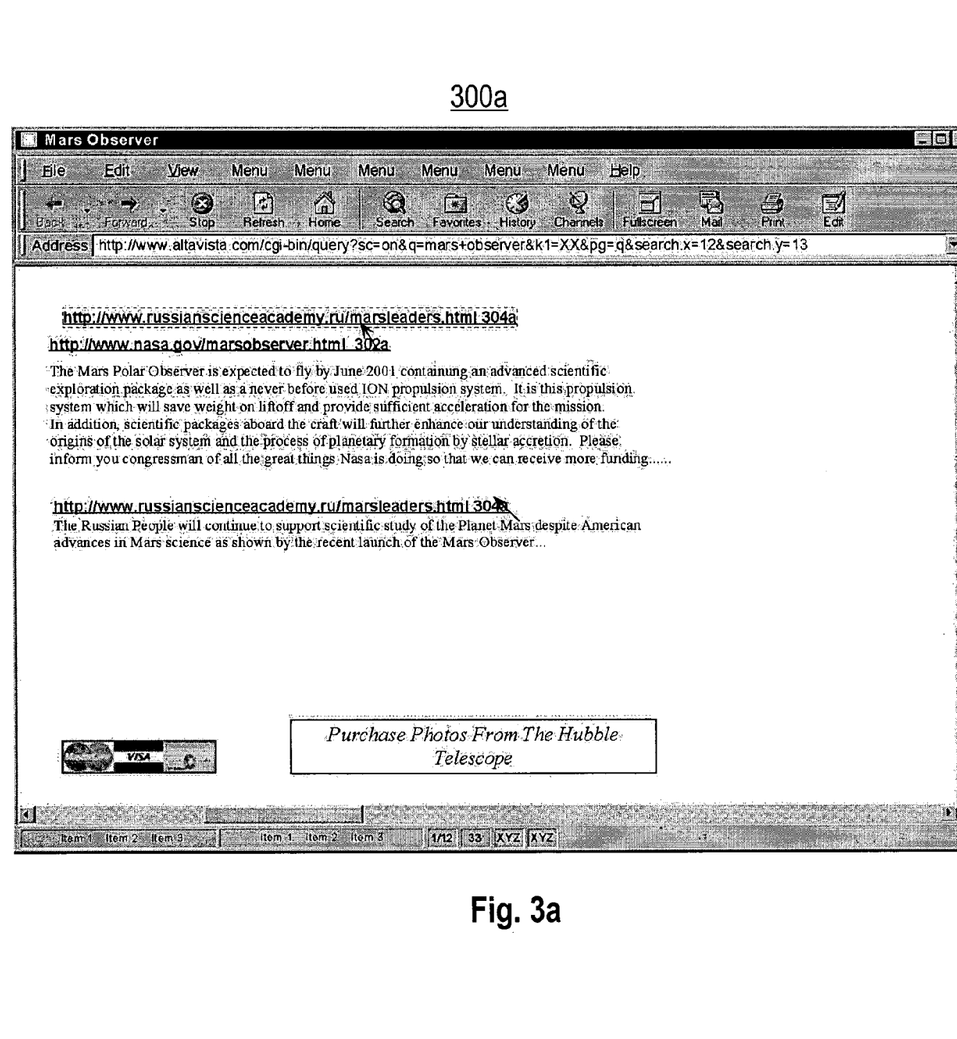
FIG. 3a is a Graphical User Interface showing the drag and drop feature as practiced by this invention.
Figure 3B:
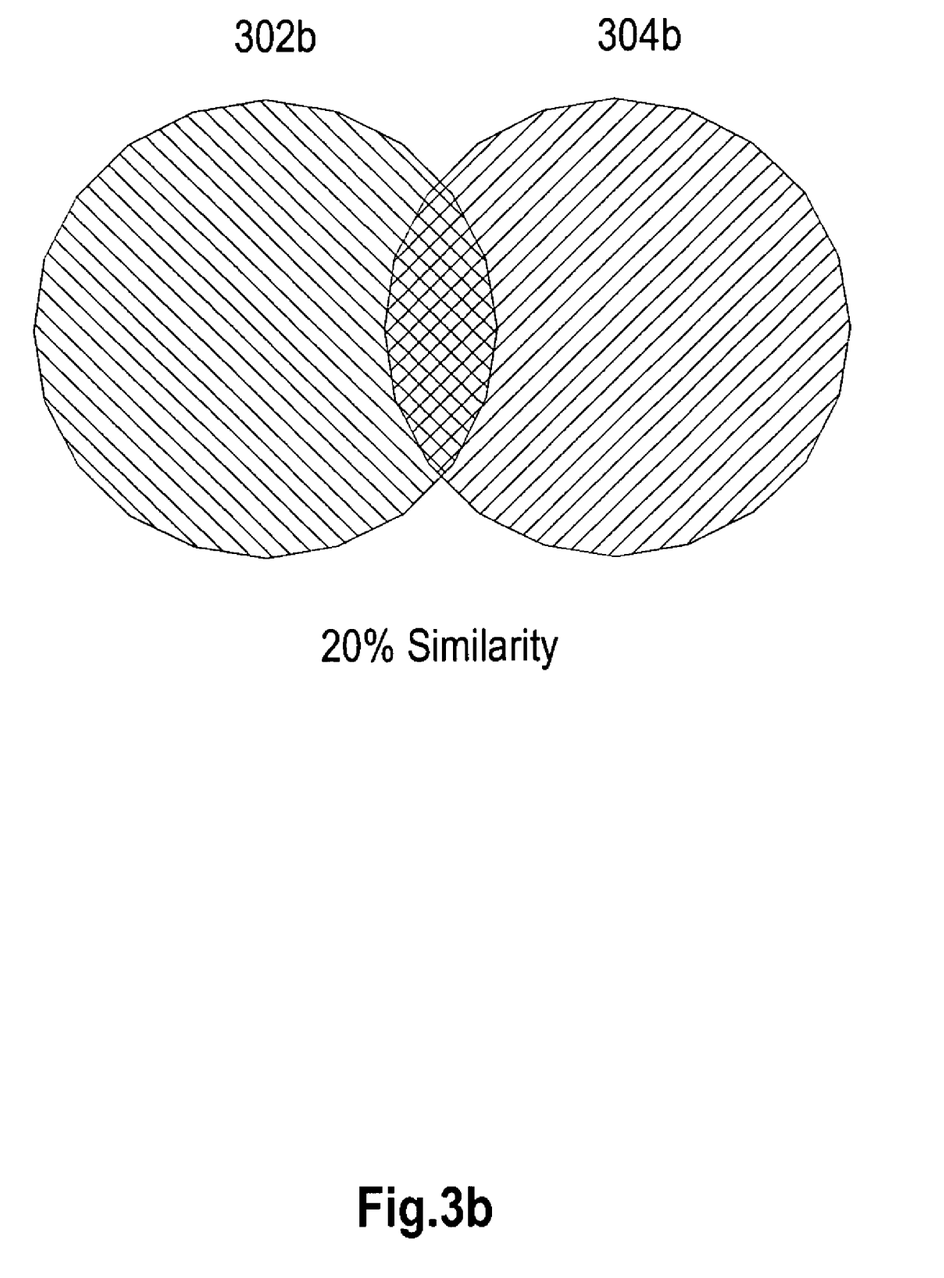
FIG. 3b is a Venn Diagram showing the percentage similarity between two documents as practiced by this invention.

FIG. 3a is a Graphical User Interface (300a) showing the drag and drop feature as practiced by this invention. The following example will illustrate how the invention works using a search result set as a preferred embodiment. Consider for instance that a user knows the content of a document A (302a) relating to a search query, in this example documents relating to the Mars Observer, and is generally satisfied with the overall content in relation to the issued search query. Another document B (304a), displayed on the same search result page, has a promising title and abstract. However, there is no further information available from the search result page. Instead of loading document B into a document viewer, reading through the content and determining whether or not the document itself has similar properties as document A, which is a time consuming process, the user actuates the invention to perform the same function. In particular, the user issues a selection request utilizing a pointing device like a mouse by clicking and holding the left mouse button to select the document link of document B. Then the user is able to drag and drop the document B (306a) identifier to the document A identifier, thereby starting the comparison process of the two selected documents. As a result, a GUI will be presented using a Venn diagram to show the similarity of the two documents. FIG. 3b is a Venn Diagram (300b) showing the percentage similarity between the two documents as practiced by this invention.

GUI/Event Manager (206) Functional Overview

Figure 4:
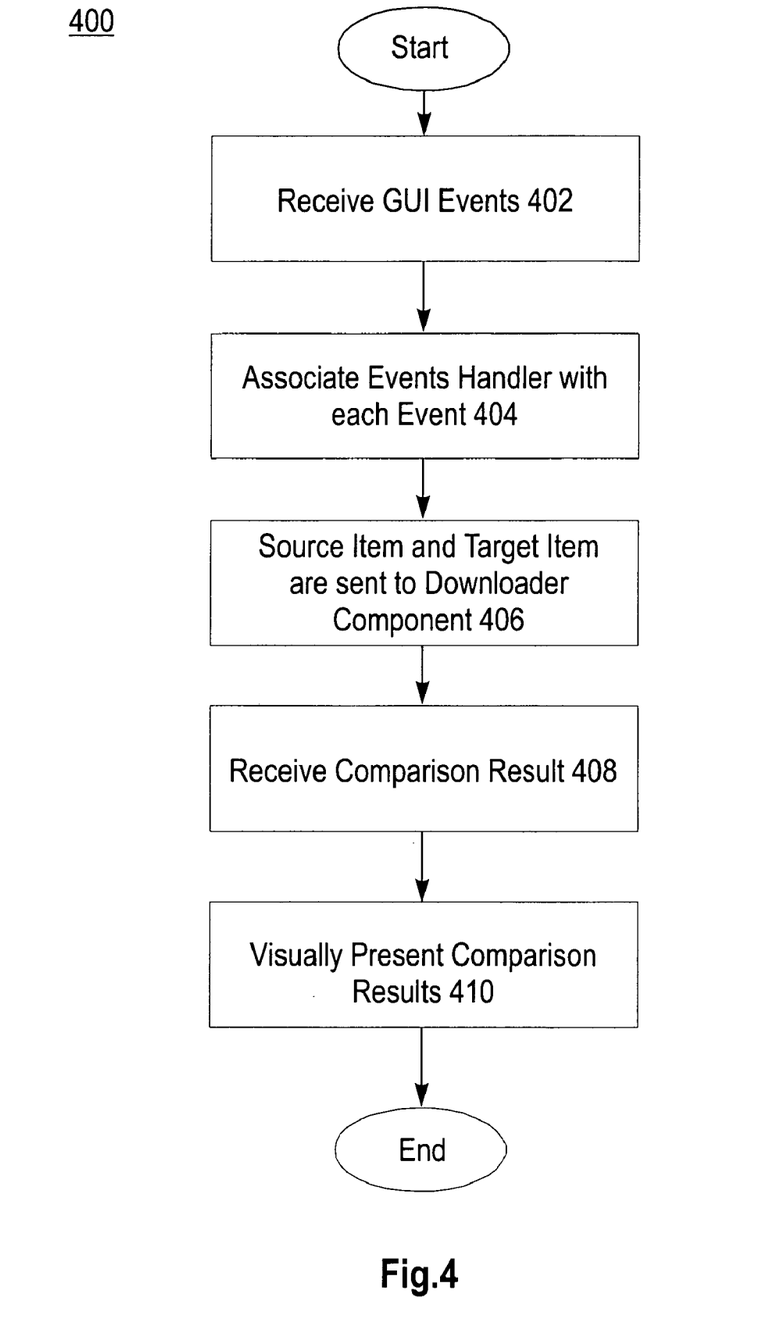
FIG. 4 is a functional overview of a graphical user interface GUI/Event Manager module as practiced by this invention.

FIG. 4 illustrates a functional overview (400) of a Graphical User Interface/Event Manager module as practiced by the invention. It acts as an interface between the web browser environment and the invention. The GUI/Event Manager receives GUI events (402) from the web browser, such as mouse movements, user selections or the equivalents for further processing. In addition, it will format result data received from the Result Set Manager for graphical representation.

Before the GUI/Event Manager processes the result set, this search result set from an Internet search engine are received by the Result Set Manager. The search result items are marked there, so that the GUI/Event Manager knows how to represent these, and associates appropriate event handlers to them (404). For each search result item there will be an event handler, which will listen to particular mouse events (e.g., mouse click, drag, drop). Mouse events are received from the web browser environment and are interpreted as a selection of one search result item. When the search result items are identified, along with the associated target, the source search result item, along with the target search result item will be forwarded to the Downloader Component (406). At the end, a comparison result, representing the similarity of the source and target search result item will be received (408) and visually represented (410).

Downloader Component (208) Functional Overview

Figure 5:
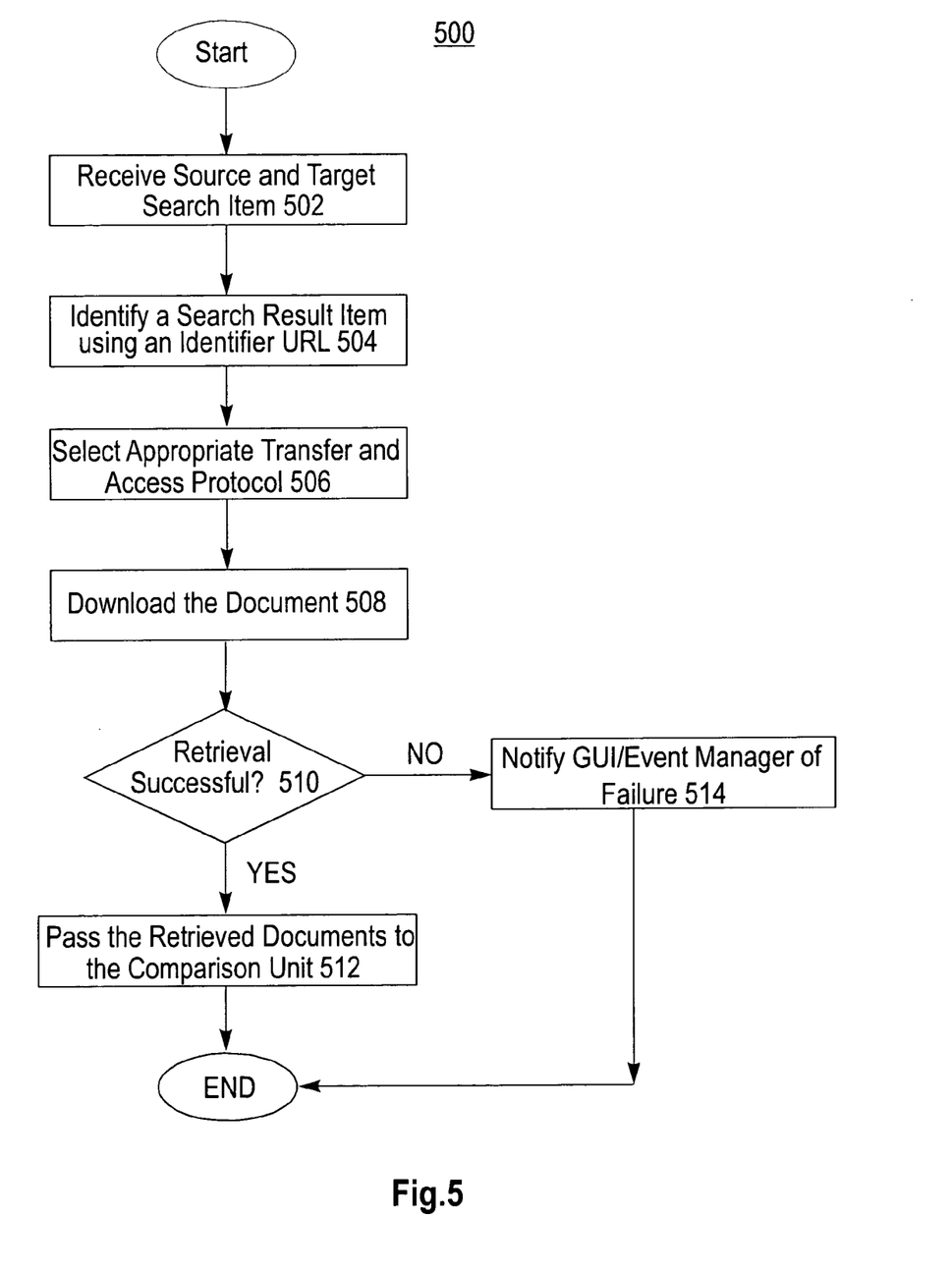
FIG. 5 is a functional overview of a Downloader Component module as practiced by this invention.

FIG. 5 is a functional overview (500) of a Downloader Component module as practiced by this invention. The Downloader Component receives as input a source and target search result items (502) from the GUI/Event Manager. A search result item is uniquely identified (504) using a URL or a similar document identifier. Then the Downloader Component selects (506) the appropriate transport and access protocol for the requested resources, and initiates a download (508) for both documents. Then a determination is made as to whether or not the download process is successful (510). In a web based environment the URLs are downloaded using the HTTP protocol. If the retrieval was successful, the Downloader Component passes (512) the content of the two search result items to the Comparison Unit for further processing. If a document cannot be successfully accessed or retrieved because of an expired or invalid URL or because of some such similar problem, the Downloader Component sends an error notification to the GUI/Event Manager, in order to notify the user (514) of the failure.

Result Set Manager (212) Functional Overview

Figure 6:
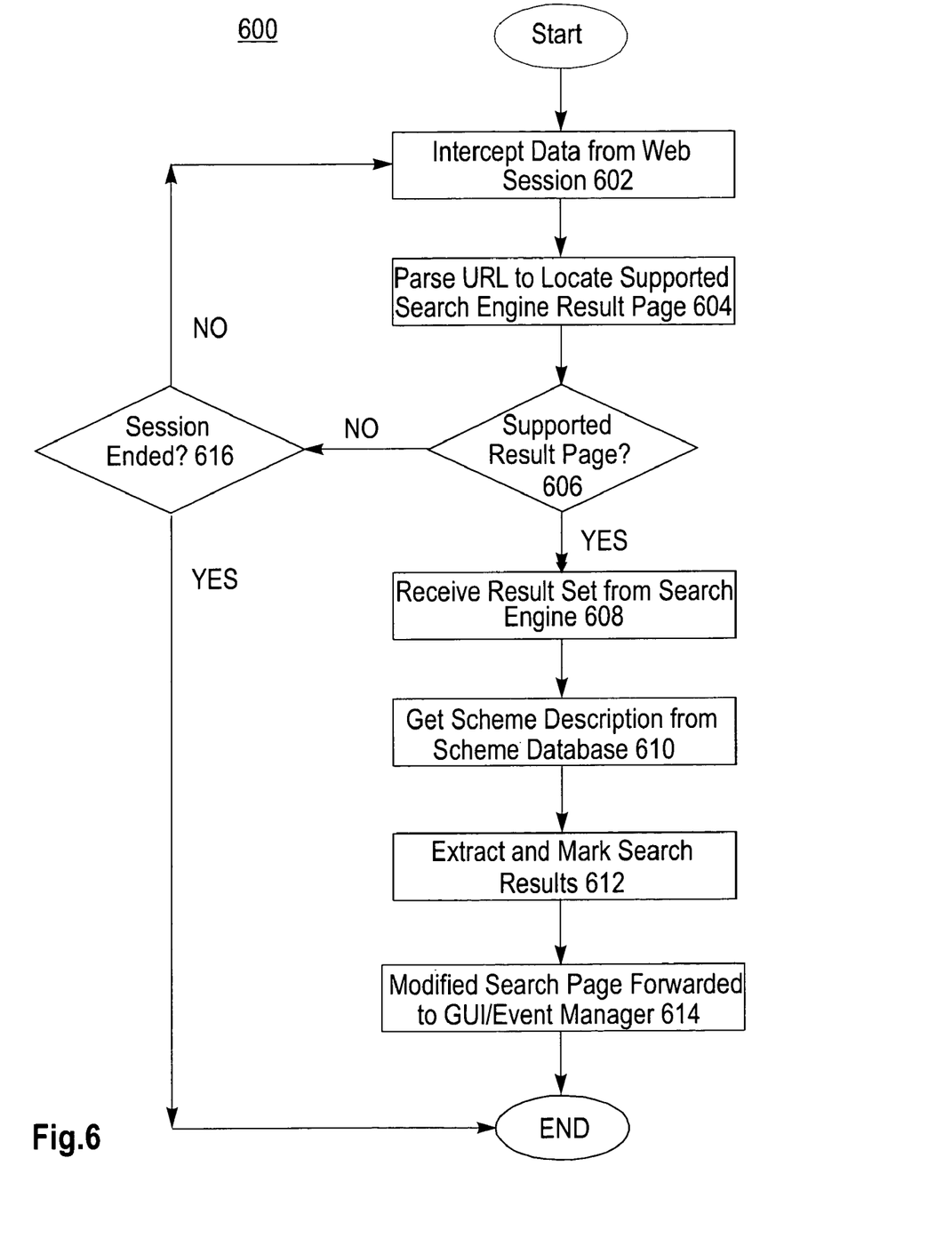
FIG. 6 is a functional overview of a Result Set Manager module as practiced by this invention.

FIG. 6 is a functional overview (600) of a Result Set Manager module as practiced by this invention. The result set manager identifies the appropriate time to activate the invention. It accomplishes this by intercepting all the data from a user's web browser session (602). The result set manager will parse the URL to identify a supported search engine (604), that is a search engine where a DTD (data type descriptor) scheme is available in the Scheme DTD DB (database). A check is made to determine whether on not a given page is supported or not (606). If a page is not supported then a determination is made as to whether or not a user session has terminated (616). If it has terminated then the process ends or conversely, if the session has not ended more data is intercepted from the web session. Once a search result page from a supported search engine is detected, the actual work of the invention begins, parsing the result set data as described below.

Comparison Unit (210)

Figure 7:
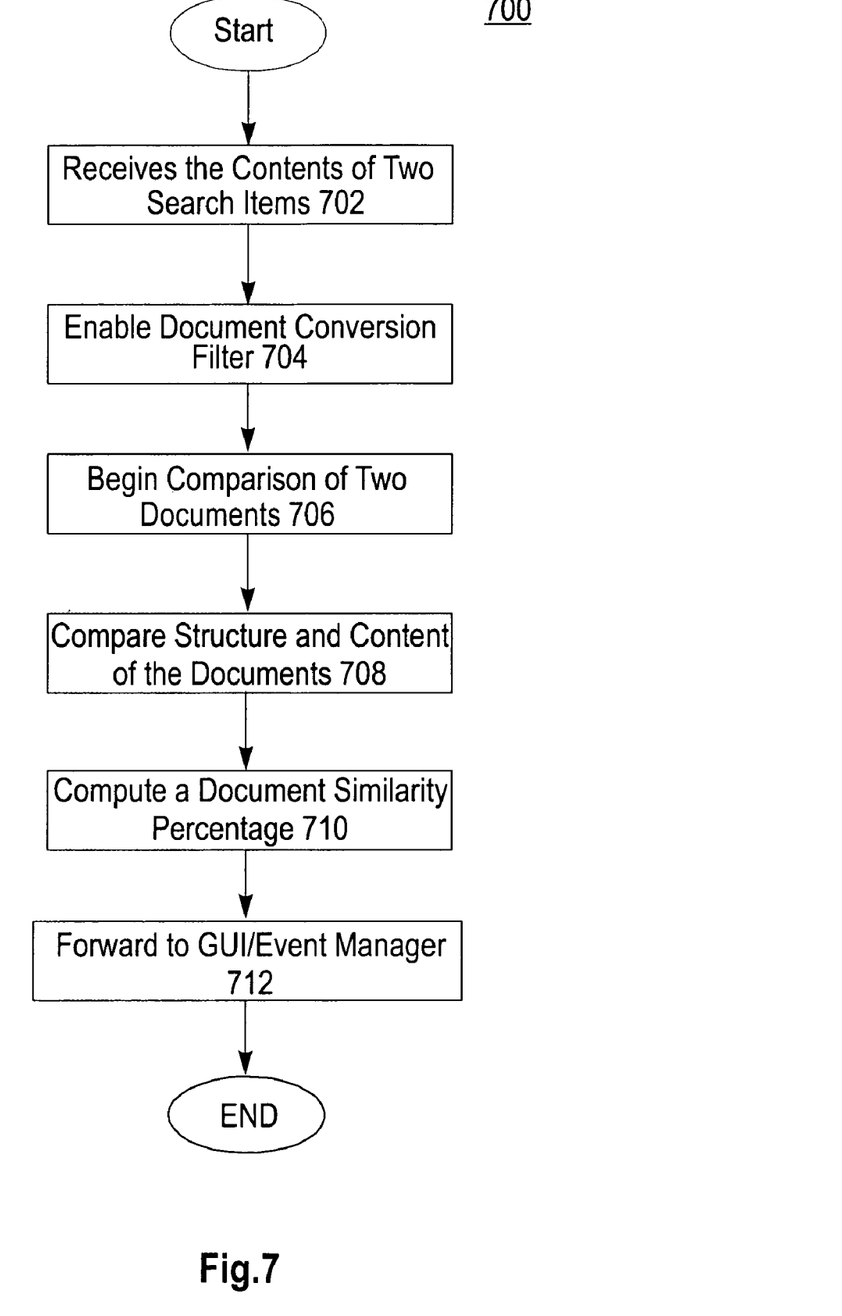
FIG. 7 is a functional overview of a Comparison Unit module as practiced by this invention.

FIG. 7 is a functional overview (700) of a Comparison Unit module as practiced by this invention. First, the Comparison Unit receives the content of two search result items (702). To effect the comparison, this invention could make use of a comparison method as described in U.S. patent application incorporated above by reference entitled "Method and Apparatus for Determining the Similarity of Complex Designs." In addition, any other comparison method or algorithm which is appropriate for the document type can be used.

Further, because the two documents may be of different type, for example, one search result item can be a PDF document and the second one an MS Word document, in order to compare the two documents, they each have to be converted (704) to the same document type before the actual comparison can occur. Companies, such as INSO (http://www.inso.com) deliver document conversion filters, which can be used to facilitate the conversion of the two documents. Then the comparison of the two documents begins (706). The comparison algorithm itself will compare the structure as well as the content of the documents (708). Then the comparison algorithm will compute a value such as a percentage (710), which represents the similarity of the two documents. This value will be forwarded to the GUI/Event Manager component (712), which in turn displays the GUI representation of the similarity result for the user.

Comparing and Representing Similarity Between Documents

Figure 8:
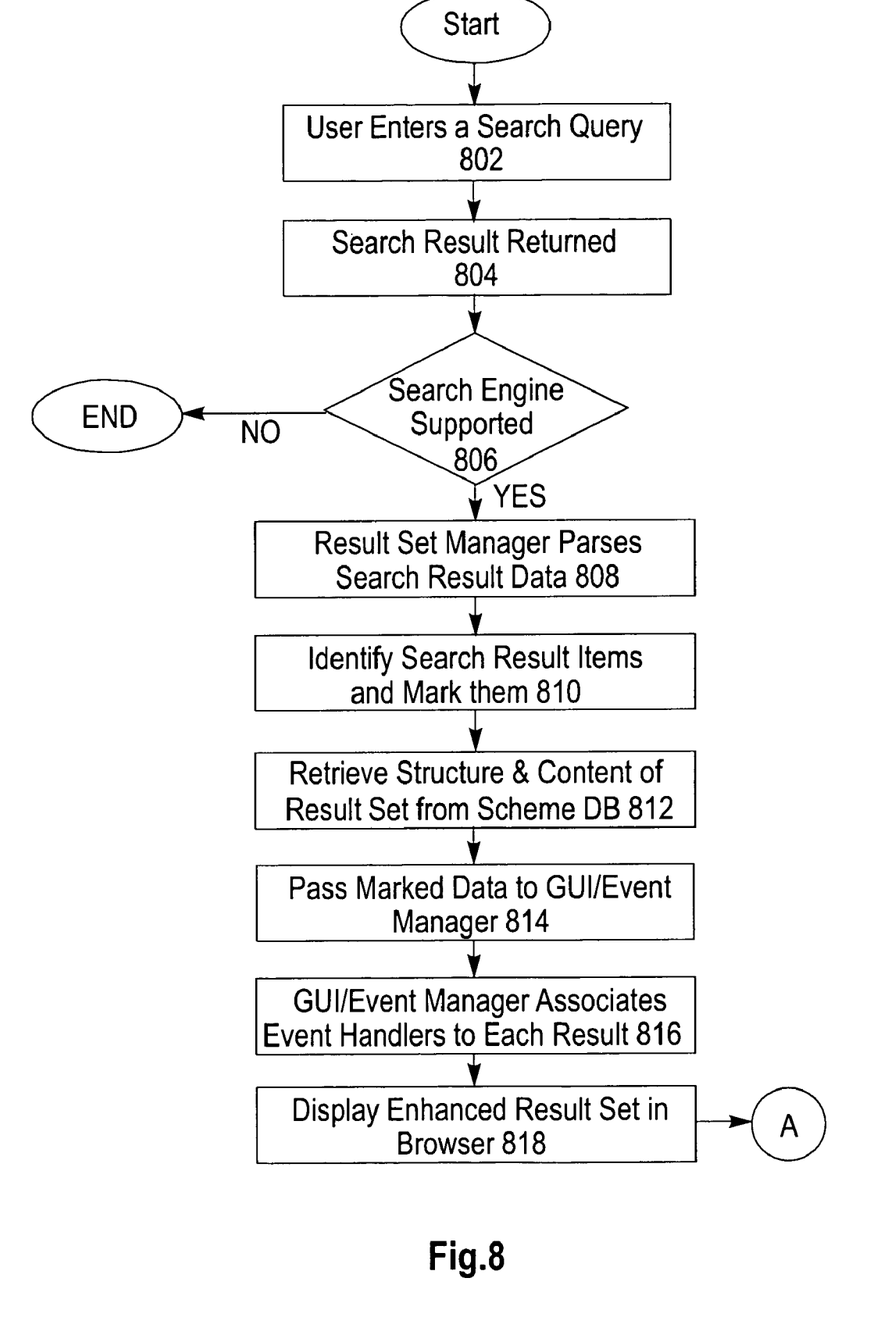
FIG. 8 is a functional overview of the entire document comparison process as practiced by this invention.
Figure 8B:
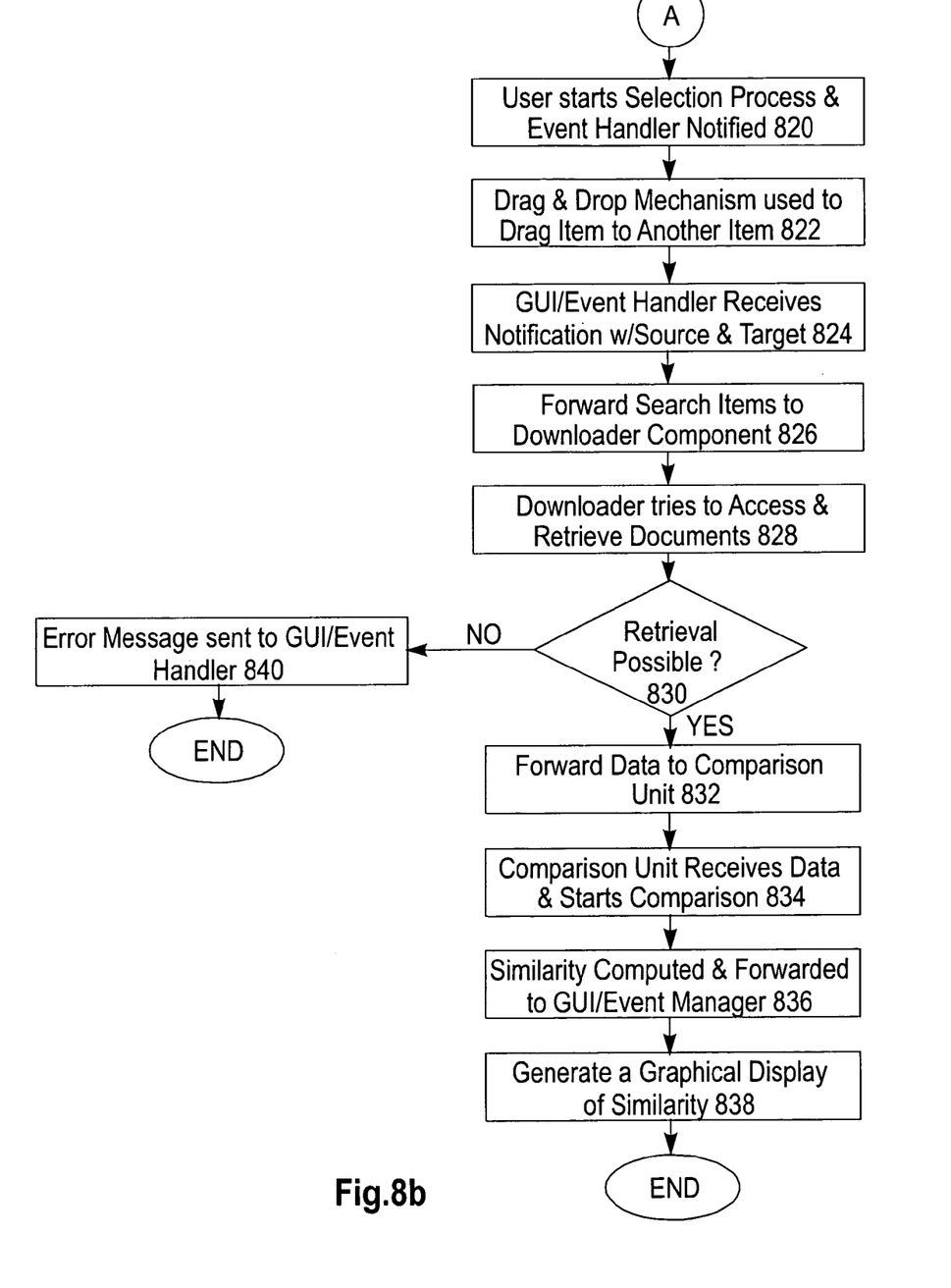

FIG. 8 illustrates the entire process (800) for Comparing and Representing the Similarity between Documents as practiced by this invention. First, a user enters a search query in the web browser (802) and a search result set will be returned (804) from an Internet search engine. A check is made to determine if the search engine is supported by the invention (806); if it isn't supported them the process ends, otherwise, the invention will be activated by the Result Set Manager when a supported search engine is successfully identified. Then the Result Set Manager parses the search result set data (808). Part of the parsing process is to identify the search result items, and to mark them (810). Knowledge of the structure and content of the search result set data is retrieved from the Scheme DTD Database (812). Once the search result set data is parsed and the search result items are properly marked, this marked data is passed to the GUI/Event Manager (814).

The GUI/Event Manager will then associate proper event handlers (816) to each search result item so that user interaction with search result items can be detected. In a preferred embodiment the document is represented in HTML. The search result items could then be marked using some special tags, and event handlers can be represented as JavaScript code (client side scripting). The so enhanced search result set page will be displayed in the user's browser (818), waiting for the user to start a selection process of a search result item. When the user starts a selection process, for example, clicking on a search result item, the GUI/Event Handler receives this notification (820). The user uses a drag and drop mechanism to drag the selected search result item to another target search result item (822). As a result, the GUI/Event Handler will receive a drag and drop event notification from the web browser environment, along with a selected source and destination search result item (824). These two search result items will be forwarded to the Downloader component (826). The Downloader component tries to access and retrieve the selected documents (828). Next, a check is made (830) to determine whether a document or both documents cannot be downloaded; if one or both documents cannot be downloaded then an error message (840) will be sent to the GUI/Event Manager and the process terminated at this time. If the Downloader component was able to successfully download both documents, this downloaded data will be forwarded to the Comparison Unit (832). Then the Comparison unit receives the document data of the two documents and starts a comparison process (834). As a result of this process a similarity result will be computed and this result is forwarded to the GUI/Event Manager (836). Finally the GUI/Event Manager will generate a graphical display to show the similarity between the two selected documents (838).

With existing technology there are several different ways to implement the invention. The implementation above uses client side scripting with HTML pages, based on a plug-in architecture. Other ways of implementing this should be obvious to someone skilled in the art after this detailed discussion of the proposed system architecture.

Discussion of Hardware and Software Implementation Options

The present invention, as would be known to one of ordinary skill in the art could be produced in hardware or software, or in a combination of hardware and software. The system, or method, according to the inventive principles as disclosed in connection with the preferred embodiment, may be produced in a single computer system having separate elements or means for performing the individual functions or steps described or claimed or one or more elements or means combining the performance of any of the functions or steps disclosed or claimed, or may be arranged in a distributed computer system or information processing system or information processing unit, interconnected by any suitable means as would be known by one of ordinary skill in art.

According to the inventive principles as disclosed in connection with the preferred embodiment, the invention and the inventive principles are not limited to any particular kind of computer system but may be used with any general purpose computer, as would be known to one of ordinary skill in the art, arranged to perform the functions described and the method steps described. The operations of such a computer, as described above, may be according to a computer program contained on a medium for use in the operation or control of the computer, as would be known to one of ordinary skill in the art. The computer medium which may be used to hold or contain the computer program product, may be a fixture of the computer such as an embedded memory or may be on a transportable medium such as a disk, as would be known to one of ordinary skill in the art.

The invention is not limited to any particular computer program or logic or language, or instruction but may be practiced with any such suitable program, logic or language, or instructions as would be known to one of ordinary skill in the art. Without limiting the principles of the disclosed invention any such computing system can include, inter alia, at least a computer readable medium or product allowing a computer to read data, instructions, messages or message packets, and other computer readable information from the computer readable medium. The computer readable medium may include non-volatile memory, such as ROM, Flash memory, floppy disk, Disk drive memory, CD-ROM, and other permanent storage. Additionally, a computer readable medium may include, for example, volatile storage such as RAM, buffers, cache memory, and network circuits.

Furthermore, the computer readable medium may include computer readable information in a transitory state medium such as a network link and/or a network interface, including a wired network or a wireless network, that allow a computer to read such computer readable information.

What is claimed is:

1. A computer readable program product for comparison of documents found on a network interconnected with a plurality of information processing units and hub processing units, the computer readable program product comprising instructions for:
   receiving a user search request on a concept of interest to a user;
   returning search result items based upon the user search request; and
   determining if a search engine is coupled to a comparison system for comparing contents of at least two documents for similarity identified in the search items, wherein an instruction of comparing documents includes returning a numeric similarity value which represents the similarity of the documents.

2. The computer readable program product as defined in claim 1, wherein the user selection request comprises a drag and drop mouse selection.

3. The computer readable program product as defined in claim 1, further comprising the instruction of:
   computing a similarity percentage for the documents.

4. An information processing system for comparison of documents found on a network interconnected with a plurality of information processing units and hub processing units, the information processing system comprising:
   a user interface for receiving a user search request on a concept of interest to a user;
   returning search result items based upon the user search request;
   a selection module for receiving the user search request to select search result items for comparison; and
   determining if a search engine is coupled to a comparison module for comparing contents of at least two documents for similarity identified in the search items, wherein the comparison module returns a numeric similarity value which represents the similarity of the documents.

5. A method for comparison of documents found on a network interconnected with a plurality of information processing units and hub processing units, the method on an information processing unit comprising the steps of:
   receiving a user search request on a concept of interest to a user;
   returning search result items based upon the user search request; and
   determining if a search engine is coupled to a comparison system for comparing content of at least two documents identified in the search results, wherein the comparison system returns a numeric similarity value which represents the similarity of the documents.

6. The method as defined in claim 5, wherein if the determining step determines that the search engine is supported by the comparison system, then:
   parsing the search result items by a result set manager; and
   identifying any document identifiers in the search result items and marking them by the result set manager.

7. The method as defined in claim 6, further comprising the step of:

retrieving knowledge of a structure and content of the search result items by the result set manager from a database.

8. The method as defined in claim 7, further comprising the step of:

passing marked search result items to a Graphical User Interface(GUI)/Event Manager.

9. The method as defined in claim 8, further comprising the step of:

associating an event handler to each search result item by a GUI/Event Manager.

10. The method as defined in claim 9, further comprising the step of:

displaying an enhanced search result item set in a display by a GUI/Event Manager.

11. The method as defined in claim 10, wherein the display comprises a web browser.

12. The method as defined in claim 11, further comprising the step of:

initiating a user selection process and notifying an event handler; and receiving a user selection.

13. The method as defined in claim 12, wherein the user selection comprises a drag and drop mouse selection.

14. The method as defined in claim 12, further comprising the step of:

receiving notification in the GUI/Event Handler with selected source and target search result items.

15. The method as defined in claim 14, further comprising the step of:

forwarding selected source and target search result items to a downloader component.

16. The method as defined in claim 15, further comprising the step of:

attempting to access and retrieve search result documents represented by the selected source and target search result items by the downloader component.

17. The method as defined in claim 16, further comprising the steps of:

determining if retrieval is possible and if the retrieval is not possible then sending an error message to the GUI/Event Handler.

18. The method as defined in claim 16, further comprising the steps of:

determining if retrieval is possible and if the retrieval is possible then retrieving search result documents represented by the selected source and target search result items by the downloader component; and forwarding the retrieved search result documents to a comparison unit.

19. The method as defined in claim 18, further comprising the steps of:

receiving retrieved search result documents in a comparison unit; and beginning comparison of the retrieved search result documents.

20. The method as defined in claim 19, further comprising the steps of:

computing a similarity value for the retrieved search result documents; and forwarding the value to the GUI/Event Manager.

21. The method as defined in claim 20, further comprising the step of:

generating a display graphic of the similarity value.

22. The method as defined in claim 21, wherein the display graphic comprises a Venn Diagram.

* * * * *